(12) United States Patent
Cheng et al.

(10) Patent No.: US 8,648,808 B2
(45) Date of Patent: Feb. 11, 2014

(54) THREE-DIMENSIONAL HUMAN-COMPUTER INTERACTION SYSTEM THAT SUPPORTS MOUSE OPERATIONS THROUGH THE MOTION OF A FINGER AND AN OPERATION METHOD THEREOF

(75) Inventors: Fuhua Cheng, Lexington, KY (US); Lu Hsien Chang, Taoyuan (TW)

(73) Assignee: Amchael Visual Technology Corp., Hsinchu (TW)

( * ) Notice: Subject to any disclaimer, the term of this patent is extended or adjusted under 35 U.S.C. 154(b) by 324 days.

(21) Appl. No.: 13/236,362

(22) Filed: Sep. 19, 2011

(65) Prior Publication Data

US 2013/0069876 A1 Mar. 21, 2013

(51) Int. Cl.
*G06F 3/02* (2006.01)

(52) U.S. Cl.
USPC .............................. 345/166; 382/103; 715/863

(58) Field of Classification Search
None
See application file for complete search history.

(56) References Cited

U.S. PATENT DOCUMENTS

| | | | |
|---|---|---|---|
| 3,184,630 A | 5/1965 | Geer | |
| 4,475,126 A | 10/1984 | Akins | |
| 4,687,310 A | 8/1987 | Cuvillier | |
| 4,751,570 A | 6/1988 | Robinson | |
| 5,461,495 A | 10/1995 | Steenblik et al. | |
| 5,532,777 A | 7/1996 | Zanen | |
| 5,546,226 A | 8/1996 | Herington | |
| 5,570,150 A | 10/1996 | Yoneyama et al. | |
| 5,727,242 A * | 3/1998 | Lo et al. | 396/324 |
| 5,757,548 A | 5/1998 | Shimomukai | |
| 5,835,133 A | 11/1998 | Moreton et al. | |
| 5,892,994 A | 4/1999 | Inaba | |
| 6,122,597 A | 9/2000 | Saneyoshi et al. | |
| 6,208,813 B1 | 3/2001 | Carlsson et al. | |
| 6,278,460 B1 | 8/2001 | Myers et al. | |
| 6,643,396 B1 | 11/2003 | Hendriks et al. | |
| 6,668,082 B1 | 12/2003 | Davison et al. | |
| 6,819,488 B2 | 11/2004 | Zanen | |
| 6,915,073 B2 | 7/2005 | Seo | |
| 6,963,661 B1 | 11/2005 | Hattori et al. | |
| 6,996,339 B2 | 2/2006 | Miyoshi et al. | |
| 7,061,532 B2 | 6/2006 | Silverstein et al. | |

(Continued)

OTHER PUBLICATIONS

International Search Report and Written Opinion for International Application No. PCT/US2011/040247 dated Oct. 7, 2011.

(Continued)

*Primary Examiner* — Jason Olson
(74) *Attorney, Agent, or Firm* — King & Schickli, PLLC

(57) ABSTRACT

A three-dimensional (3D) human-computer interaction system that supports mouse operations through the motion of a finger and an operation method thereof are provided. In the provided system and method, a multi-view video recording device captures an image of a finger of an operator, and has an information connection with an electronic information device through an interaction handling program. After the interaction handling program is executed, a CPU of the electronic information device performs operations such as computation, synthesis, image presentation, gesture tracking, and command recognition on the captured image to interpret a motion of the finger of the user. Accordingly, the user may perform operations on an operation interface of the electronic information device by using the finger in a 3D space in a noncontact mode. The present invention is particularly applicable to application software with 3D space operations as it can perform 3D interaction with the application software.

19 Claims, 9 Drawing Sheets

(56) References Cited

U.S. PATENT DOCUMENTS

| | | | |
|---|---|---|---|
| 7,065,242 B2 | 6/2006 | Petrov et al. | |
| 7,075,735 B2 | 7/2006 | Nozawa et al. | |
| 7,106,365 B1 | 9/2006 | Sogawa | |
| 7,132,933 B2 | 11/2006 | Nakai et al. | |
| 7,170,677 B1 | 1/2007 | Bendall et al. | |
| 7,181,136 B2 | 2/2007 | Perisic | |
| 7,263,209 B2 | 8/2007 | Camus et al. | |
| 7,274,800 B2* | 9/2007 | Nefian et al. | 382/103 |
| 7,362,881 B2 | 4/2008 | Hattori et al. | |
| 7,420,750 B2 | 9/2008 | Kuthirummal et al. | |
| 7,606,485 B2 | 10/2009 | Ohashi | |
| 7,710,451 B2 | 5/2010 | Gluckman et al. | |
| 7,877,706 B2* | 1/2011 | Albertson et al. | 715/863 |
| 8,267,781 B2* | 9/2012 | Geiss | 463/32 |
| 8,325,978 B2* | 12/2012 | Chai et al. | 382/103 |
| 8,351,651 B2* | 1/2013 | Lee | 382/103 |
| 8,396,252 B2* | 3/2013 | El Dokor | 382/106 |
| 8,417,026 B2* | 4/2013 | Wu et al. | 382/165 |
| 2001/0053287 A1 | 12/2001 | Inaba | |
| 2003/0072569 A1* | 4/2003 | Seo | 396/331 |
| 2003/0156187 A1 | 8/2003 | Gluckman et al. | |
| 2004/0189720 A1* | 9/2004 | Wilson et al. | 345/863 |
| 2004/0252863 A1 | 12/2004 | Chang et al. | |
| 2005/0057806 A1 | 3/2005 | Nozawa et al. | |
| 2005/0185050 A1 | 8/2005 | Ohashi | |
| 2005/0254817 A1 | 11/2005 | McKee | |
| 2006/0077543 A1 | 4/2006 | Miyoshi et al. | |
| 2006/0082879 A1 | 4/2006 | Miyoshi et al. | |
| 2006/0115119 A1 | 6/2006 | Nagaoka et al. | |
| 2006/0204038 A1 | 9/2006 | Yokota et al. | |
| 2007/0165306 A1 | 7/2007 | Bendall et al. | |
| 2008/0031514 A1 | 2/2008 | Kakinami | |
| 2009/0168152 A1 | 7/2009 | Gelernt et al. | |
| 2010/0289874 A1 | 11/2010 | Cheng | |
| 2013/0063336 A1* | 3/2013 | Sugimoto et al. | 345/156 |

OTHER PUBLICATIONS

Non-Final Office Action for U.S. Appl. No. 12/885,810 dated Nov. 15, 2012.

Final Office Action for U.S. Appl. No. 12/885,810 dated Jul. 8, 2013.

* cited by examiner

THREE-DIMENSIONAL HUMAN-COMPUTER INTERACTION SYSTEM THAT SUPPORTS MOUSE OPERATIONS THROUGH THE MOTION OF A FINGER AND AN OPERATION METHOD THEREOF

BACKGROUND OF THE INVENTION

1. Field of Invention

The present invention relates to a three-dimensional (3D) human-computer interaction system that supports mouse operations through the motion of a finger and an operation method thereof, in which the system has an information connection with an electronic information device, so that an operator is enabled to express a motion by using a finger and perform operations on an operation interface of the electronic information device in a 3D space in a noncontact manner; and the present invention particularly relates to a 3D human-computer interaction system that supports mouse operations through the motion of a finger and an operation method thereof, in which a multi-view video recording device is used to capture an image of a finger of an operator, perform interpretation and achieve command recognition.

2. Related Art

At present, the most famous physical products of a human-computer interface interaction system include the X-BOX from Microsoft Company and the Wii manufactured by Nintendo Company. In the human-computer interface interaction, an electronic information device senses a motion of an operator and interprets the sensed result into a corresponding motion command. Currently, the technologies using gestures as a computer input device have already been disclosed or applied for patents. Most of the technologies are based on the function of simulating mouse operations by using a two-dimensional (2D) input device, for example:

1. U.S. Pat. No. 6,057,540 "Mouseless optical and position translation type screen pointer control for a computer system";
2. U.S. Pat. No. 7,274,800 "Dynamic gesture recognition from stereo sequences"; and
3. U.S. Pat. No. 7,849,421 "Virtual mouse driving apparatus and method using two-handed gestures".

The above patents are the disclosure of the prior art of the human-computer interaction, which can be roughly classified into the following categories:

(1) Using combinations of the left and right gestures to form various mouse commands, and the image capture device is an ordinary single-view webcam;

(2) Using 2D motions of the finger and some additional keys to replicate mouse commands, and the image capture device consists of a single-view webcam and a movement sensor;

(3) Using motions of a hand or arms, including depth information, to define various mouse commands, and the image capture device consists of multiple sets of cameras; and (4) Using 2D/3D motions of a hand or a finger to define various mouse commands, and the image capture device consists of an infrared laser and an infrared camera, or a set of infrared diodes and a set of infrared sensors.

The apparatuses/techniques in categories (1) and (2) are mainly applied to ordinary digital cameras to capture a motion image and then interpret a motion command. The acquired image information is limited to 2D information. The 3D motion part further requires at least one movement sensor for combination.

As far as the apparatus/technique in category (3) is concerned, a 3D camera or multiple sets of cameras are used to capture an image. The apparatuses have a large number of components and are complicated. Moreover, the whole implementation result is affected by whether the cameras may be precisely synchronized. Also, after the images captured by a numbers of image capturing devices, depth computation needs to be performed on each whole image to interpret the image into a motion command. Once a small problem occurs on the definition of the parameter, distortion may be caused on the interpretation result.

As far as the apparatus/technique in category (4) is concerned, more different cameras and sensors need to be combined. The integral formation complexity is much higher than the apparatuses/techniques in categories (1) and (2).

SUMMARY OF THE INVENTION

In view of the above problems, the present invention is mainly directed to a "3D human-computer interaction system that supports mouse operations through the motion of a finger and an operation method thereof", capable of capturing a planar motion and depth information of a motion of an operator and precisely interpreting them into a motion command. Accordingly, in the present invention, a multi-view video recording device is mainly applied to capture an image synchronously, and has an information connection with an electronic information device through an interaction handling program. By executing the interaction handling program, a CPU of the electronic information device performs operations such as computation, synthesis, image presentation, gesture tracking, and command recognition on the captured images to interpret a motion of a finger of a user. Accordingly, the user may perform operations on the electronic information device by using a finger in a 3D space in a noncontact mode, for example, the user moves a cursor, or delivers a command such as a single-click or a double-click of a file or a directory or a button. The present invention is particularly applicable to application software with a 3D space operation function, which may further execute a 3D command or enable 3D rotation of a graphic.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
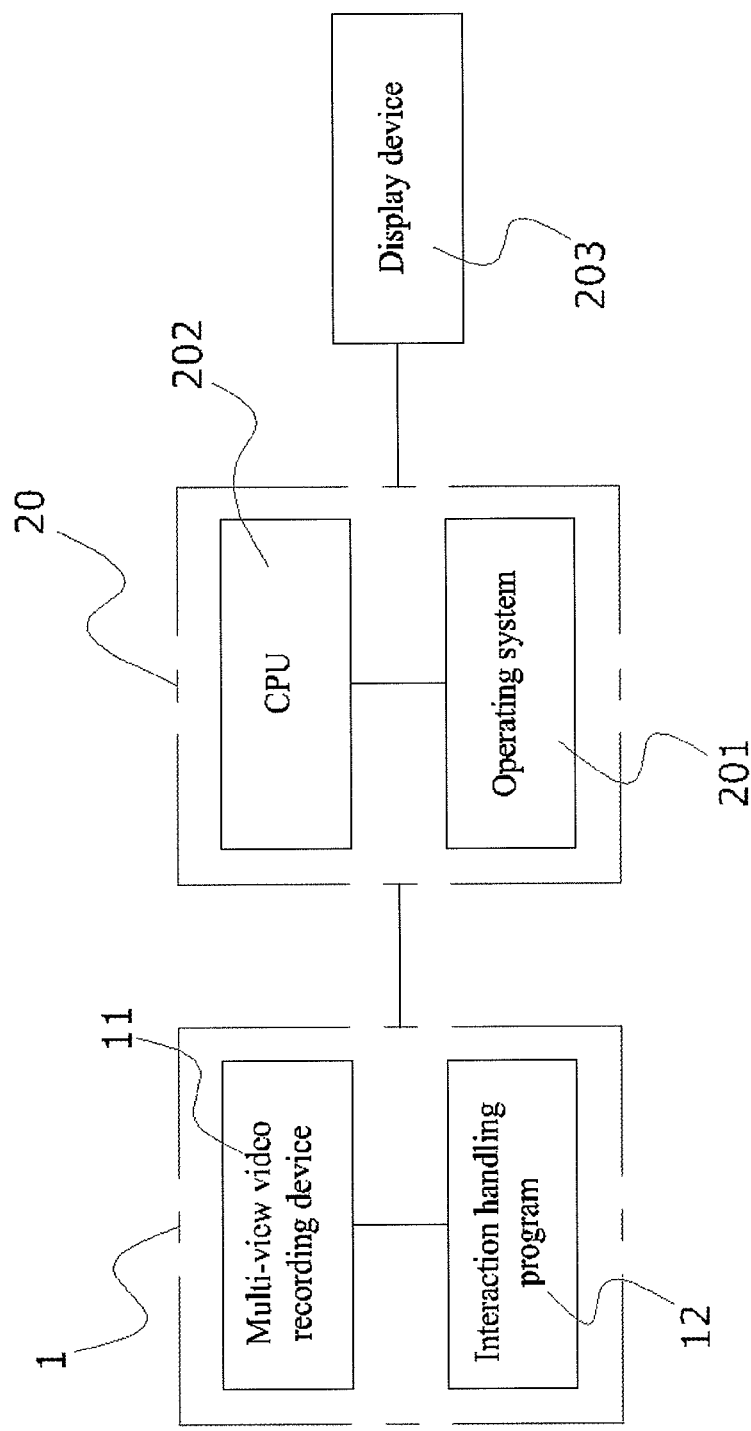
FIG. 1 is a schematic diagram of formation of the present invention.

FIG. 1 is a schematic diagram of formation of the present invention. As shown in FIG. 1, a 3D human-computer interaction system that supports mouse operations through the motion of a finger 1 is formed of a multi-view video recording device 11 and an interaction handling program 12. The multi-view video recording device 11 synchronously captures a multi-view image. The interaction handling program 12 may be installed in an operating system 201 of an electronic information device 20. After initialization is executed, an information connection is accomplished between the 3D human-computer interaction system that supports mouse operations through the motion of a finger 1 and the electronic information device 20. Moreover, the interaction handling program 12 may be executed to enable a CPU 202 of the electronic information device 20 to perform operations such as computation, synthesis, image presentation, gesture tracking, and command recognition on the image information acquired after the multi-view video recording device 11 captures the image, and then convert the information after the command recognition is completed into a command motion capable of being executed in an operation interface (not shown) of the electronic information device 20. Next, the electronic information device 20 may be, for example, a computer or a television, which has a display device 203. The operation interface is presented at the display device 203. Through the function provided by the present invention, the operator may generate a control coordinate by using the motion of an index finger pulp in 3D space to produce a 2D translation or a 3D press operation that needs to change in depth, so as to achieve the objective of operating the electronic information device 20.

Figure 2:
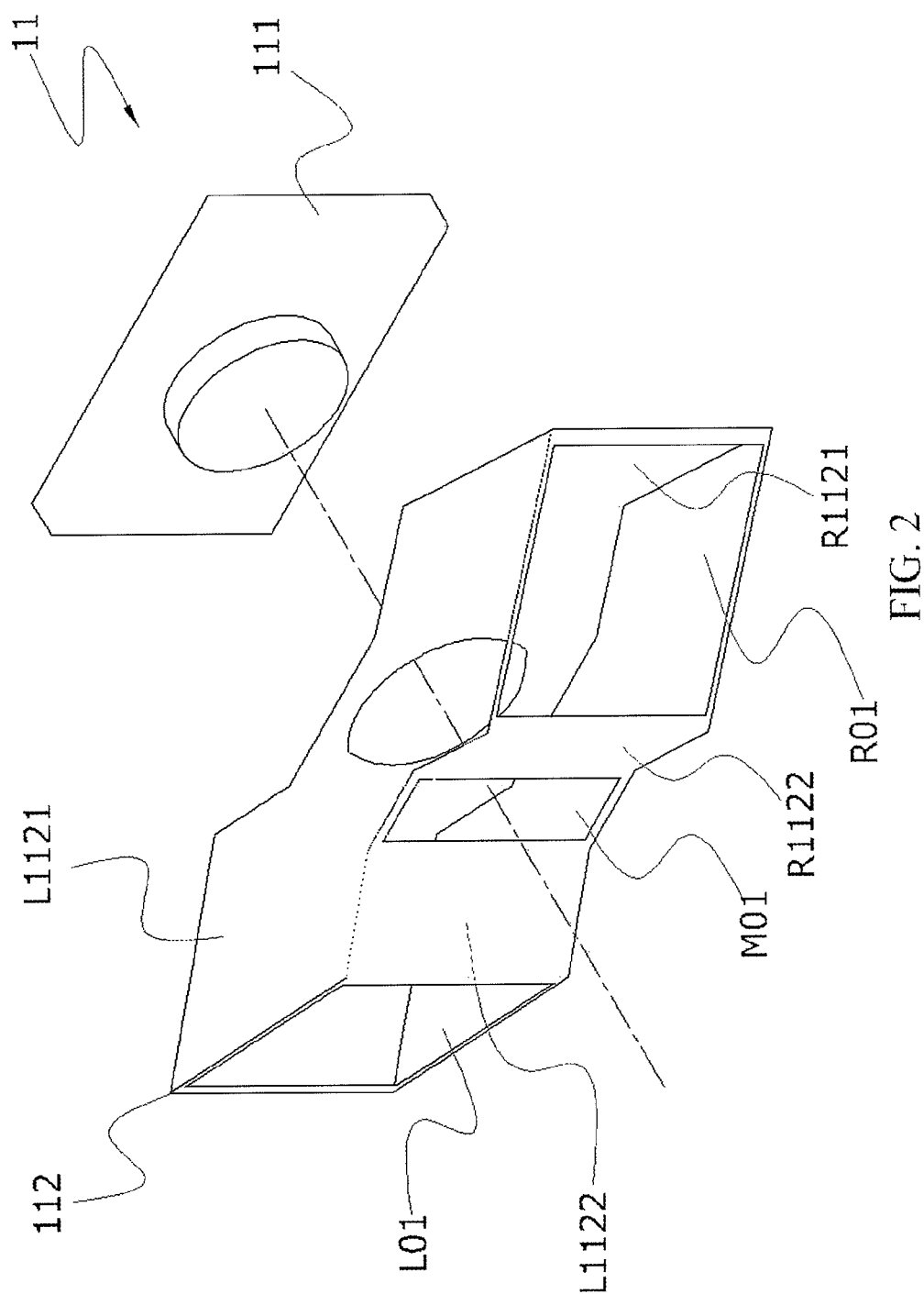
FIG. 2 is a schematic diagram of members of the present invention.
Figure 3:
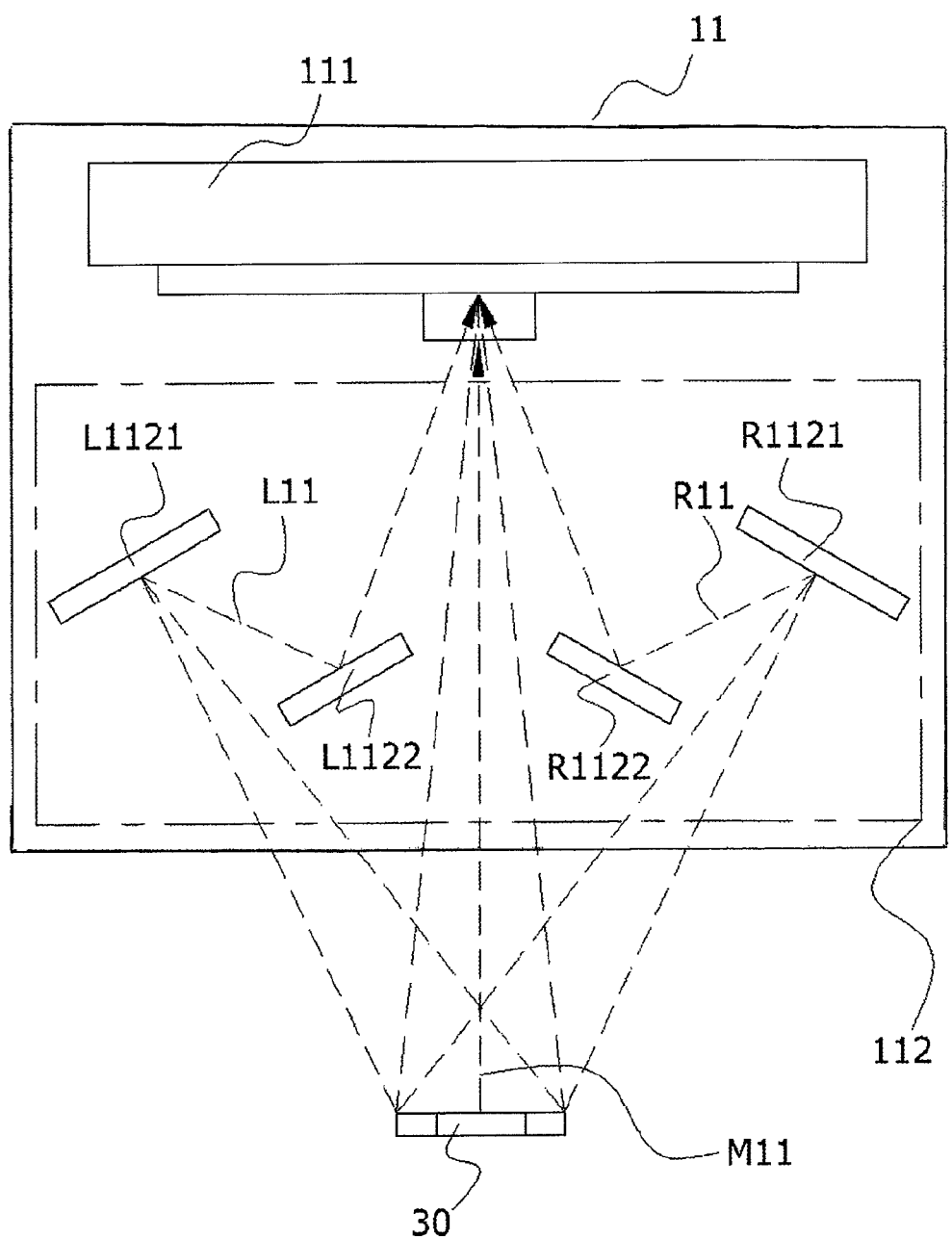
FIG. 3 is a schematic diagram of an optical path of a multi-view video recording device.

Referring to FIG. 2, the multi-view video recording device 11 is formed of an image sensor module 111 (which may be a complementary metal-oxide-semiconductor (CMOS) sensor module or a charge-coupled device (CCD) sensor module) and a multi-view image capturing module 112. The multi-view image capturing module 112 is mainly formed of a left image capturing opening L01, a left first reflecting surface L1121, a left second reflecting surface L1122, a right image capturing opening R01, a right first reflecting surface R1121, a right second reflecting surface R1122, and a central image capturing opening M01. Referring to FIG. 3 at the same time, FIG. 3 is a schematic diagram of optical paths of the multi-view video recording device 11. A left image capturing path L11 is formed from the left first reflecting surface L1121 to the left second reflecting surface L1122 and further to the image sensor module 111. A right image capturing path R11 is formed from the right first reflecting surface R1121 to the right second reflecting surface R1122 and further to the image sensor module 111. A central image capturing path M11 is formed between the left image capturing path L11 and the right image capturing path R11. Further referring to FIG. 3, when the multi-view video recording device 11 intends to capture an image of an object 30, the image capturing path thereof includes view angles in three directions of the left image capturing path L11, the right image capturing path R11 and the central image capturing path M11 at the same time. Accordingly, when capturing an image, the multi-view video recording device 11 synchronously acquires a multi-view image of the object 30. Therefore, the images captured at all view angles may be computed and synthesized into a 3D image having a desirable depth of field.

Figure 4:
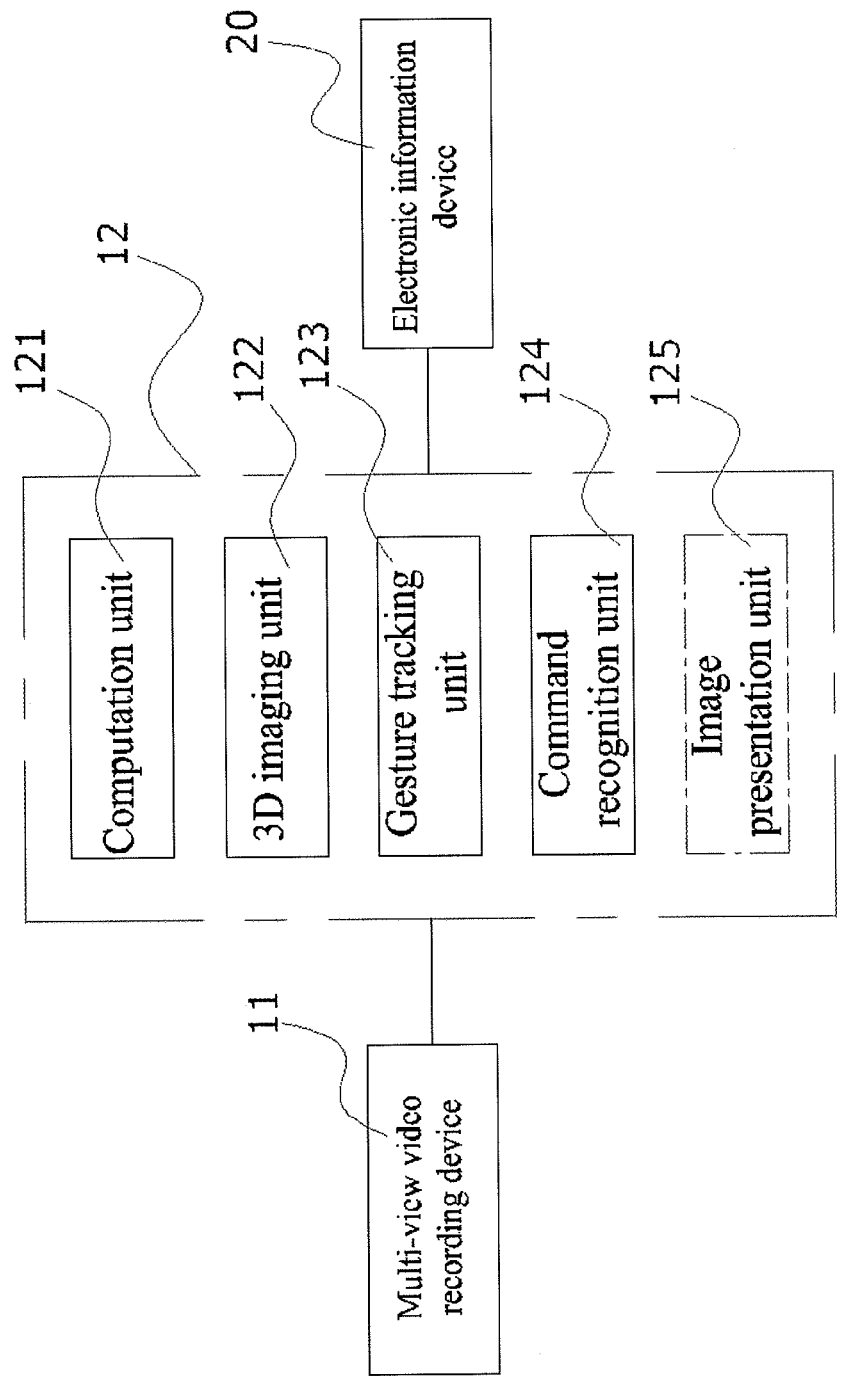
FIG. 4 is a schematic diagram of units of an interaction handling program of the present invention.

Referring to FIG. 4, the interaction handling program 12 may be installed in an operating system of the electronic information device 20 in advance (referring to FIG. 1). When the hardware installation of the multi-view video recording device 11 and the electronic information device 20 is completed for the first time, the interaction handling program 12 executes an initialization operation and further accomplishes an information connection between the multi-view video recording device 11 and the electronic information device 20. Subsequently, when the multi-view video recording device 11 performs an operation (for example, an image capturing operation), the interaction handling program 12 executes the related program processing. As shown in FIG. 4, the interaction handling program 12 at least includes a computation unit 121, a 3D imaging unit 122, a gesture tracking unit 123, a command recognition unit 124, and an image presentation unit 125.

(1) The computation unit 121 may perform computation, correction and preprocessing on the image captured by the multi-view video recording device 11, for example, recording of a finger feature, or recording and conversion of a skin color and a color model.

(2) The 3D imaging unit 122 may perform synthesis on the computed result, that is, establish the multi-view image of the object synchronously captured by the multi-view video recording device 11 into a 3D image, or further establish the 3D image into a depth map.

(3) The gesture tracking unit 123 converts each stop point of the finger into a coordinate position of control according to the image acquired by the multi-view video recording device 11, for tracking a movement track and motion changes of the finger of the operator.

(4) The command recognition unit 124 is used for recognizing a motion change of the finger in 3D coordinates according to the image acquired by the multi-view video recording device 11, and mapping the motion change to a preset operation command.

(5) The present invention may further include an image presentation unit 125, which mainly presents the image acquired by the multi-view video recording device 11 as a 3D image after the 3D imaging unit 122 performs synthesis on the computed result. Therefore, the 3D human-computer interaction system that supports mouse operations through the motion of a finger 1 of the present invention may also serve as a capture device of the 3D image. If the electronic information device 20 is combined with a 3D display screen, the present invention may also be used as a 3D video camera to further enhance the applicability thereof.

Figure 5:
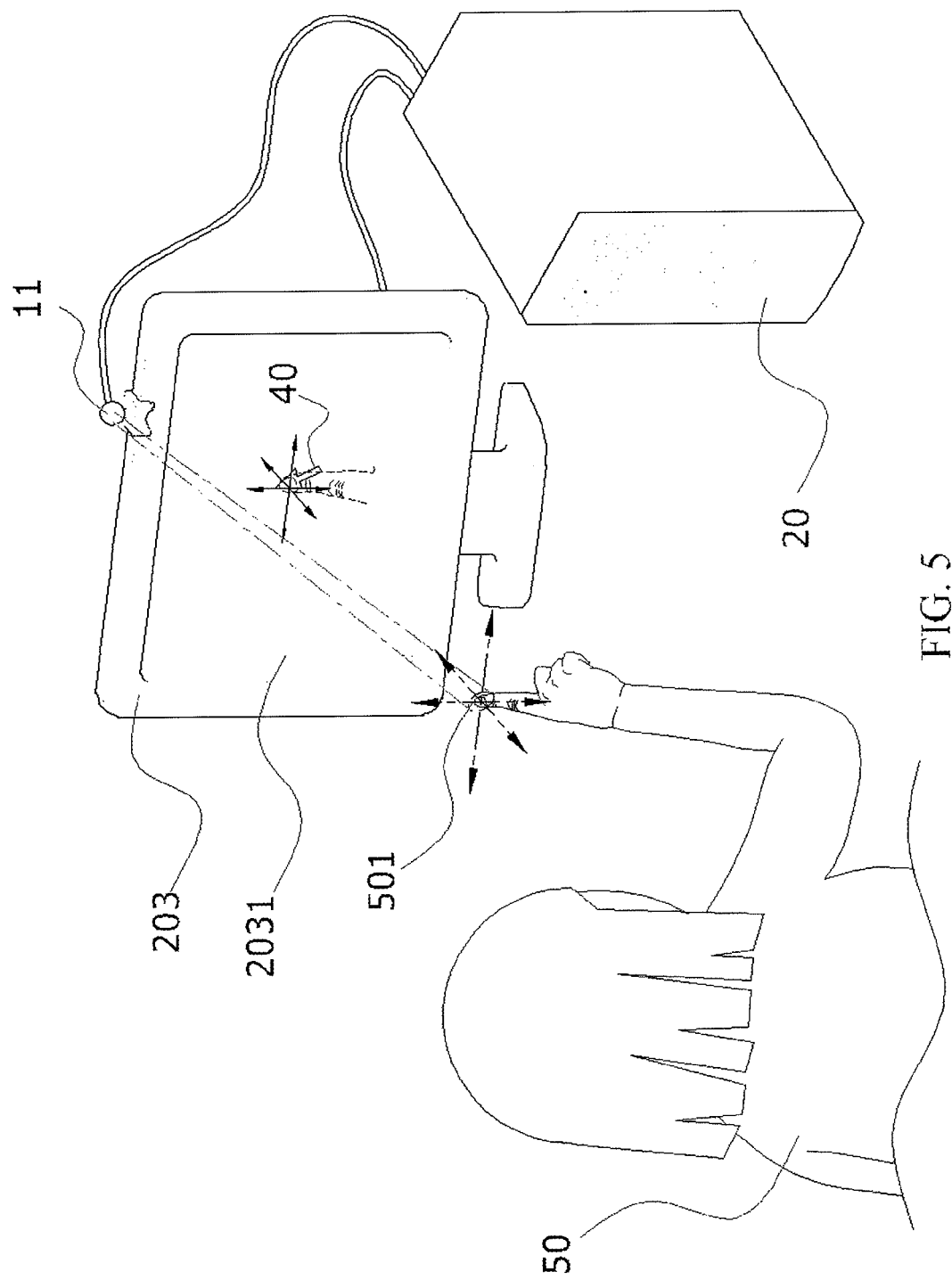
FIG. 5 is a schematic diagram (1) of implementation of the present invention.

FIG. 5 is a schematic diagram (1) of implementation of the present invention. As shown in FIG. 5, based on the illustration in FIG. 4, when the interaction handling program 12 is installed in the electronic information device 20 and the hardware installation of the multi-view video recording device 11 and the electronic information device 20 is completed, the interaction handling program 12 completes initialization, that is, the information connection between the multi-view video recording device 11 and the electronic information device 20 is accomplished. The electronic information device 20 at least has a display device 203. Further referring to FIG. 5, when an operation interface 2031 of the display device 203 presents an operation mode (for example, a mouse operation mode), the display device 203 presents an operation index 40. Furthermore, an operator 50 displaces in front of the multi-view video recording device 11 by using a finger (for example, an index finger) 501 as the body feature thereof, so that the multi-view video recording device 11 synchronously captures the finger 501 and the movement track thereof.

Figure 6:
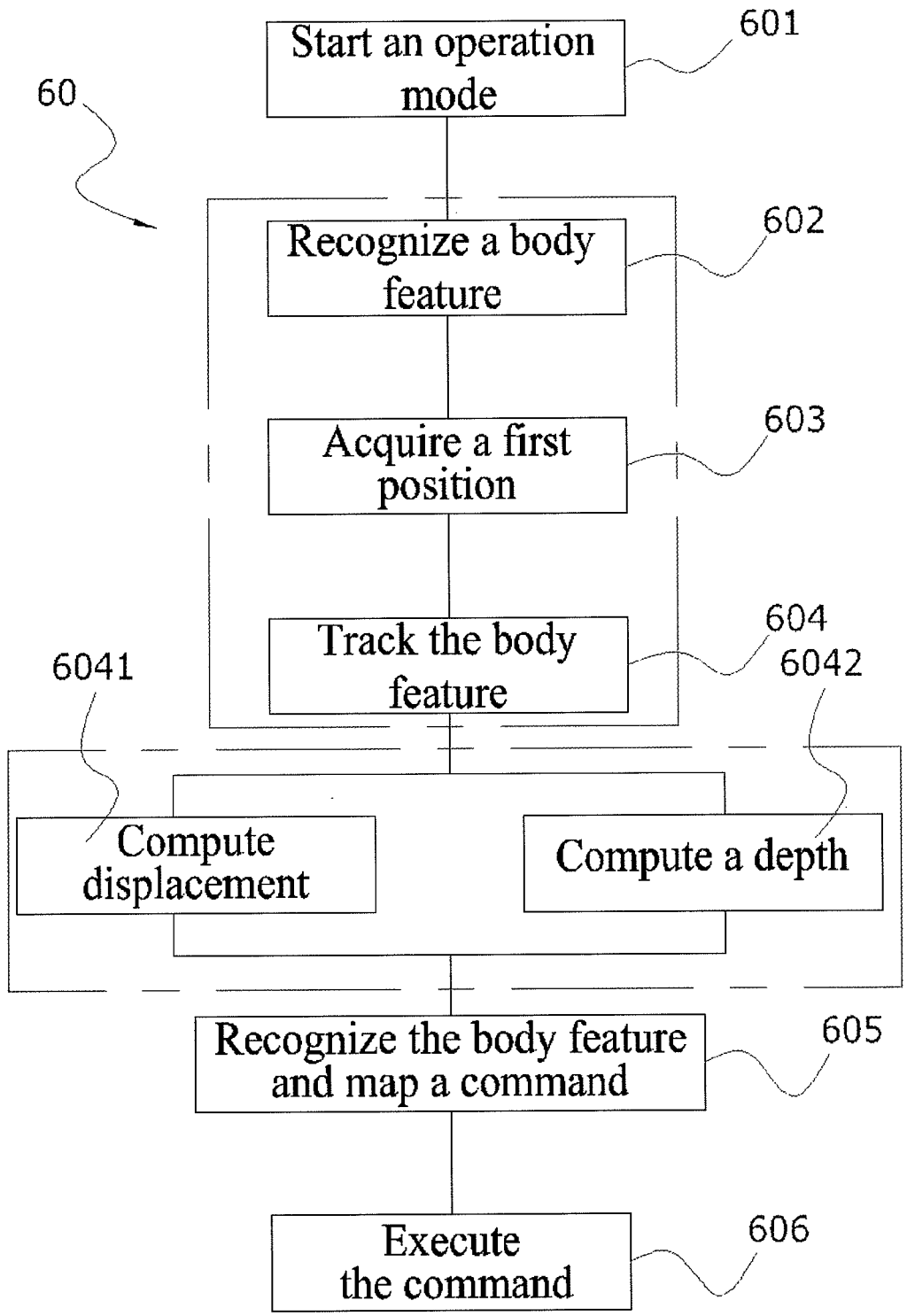
FIG. 6 is a schematic diagram (2) of implementation of the present invention.

FIG. 6 is a schematic diagram (2) of implementation of the present invention. As shown in FIG. 6, after the 3D human-computer interaction system that supports mouse operations through the motion of a finger 1 of the present invention is installed in the electronic information device 20, an operation method thereof 60 is as follows.

(1) Start an operation mode 601. The interaction handling program 12 starts an operation mode, so that the electronic information device 20 enters the operation mode. The operation mode is presented at the operation interface 2031 of the display device 203.

(2) Recognize a body feature 602. The multi-view video recording device 11 synchronously captures an image of a body feature applied by an operator in multi-view directions. The operator 50 in the embodiment of the present invention uses the finger (the index finger) 501 of a hand as a body feature, but the present invention is not limited thereto. For example, the body feature may also be a number of fingers, a finger-like body, a skin color, a joint position, or a joint motion change. The image capture operation of the multi-view video recording device 11 is continuously performed. Each captured image is recorded and recognized by the interaction handling program 12.

(3) Acquire a first position 603. Through the foregoing steps, the interaction handling program 12 acquires a first position (or a start point position) of the body feature (the finger 501) after the recognition. Referring to FIG. 5 in combination, the first position is the position of the operation cursor 40 in FIG. 5.

(4) Track the body feature 604. By using the body feature of the acquired first position 603 as a basic parameter, the multi-view video recording device 11 continuously captures images of the same body feature to achieve an objective of continuous tracking. When the operation cursor 40 (that is, the finger 501) starts displacement, a next position (that is, a second position, a third position, . . . ) occurs right away. Furthermore, after the next position occurs, the previous position may be recorded and used as a relative reference for the next position.

(5) Compute displacement 6041 and compute a depth 6042. When the body feature moves from the previous position to the next position, the interaction handling program 12 synchronously computes displacement and a depth for the process of position changes.

(6) Recognize the body feature and map a command 605. After the computation of the displacement and the depth, the acquired information of the position change of the body feature is mapped to a pre-defined operation command, such as moving left, moving right, moving up, moving down, moving forward, moving backward, single-click, and double-click.

(7) Execute the command 606. Operation is performed according to the mapped command.

After the operation mode is started 601, the multi-view video recording device 11 continuously captures and tracks images of the body feature of the operator, and the interaction handling program 12 performs computation and feature recognition on the captured image to execute the command. Accordingly, the operator may operate the electronic information device 20 with the body feature as long as the operator stands within a valid range that the multi-view video recording device 11 is capable of capturing the image, which is equivalent to the operations by holding a physical mouse with a hand.

Figure 7:
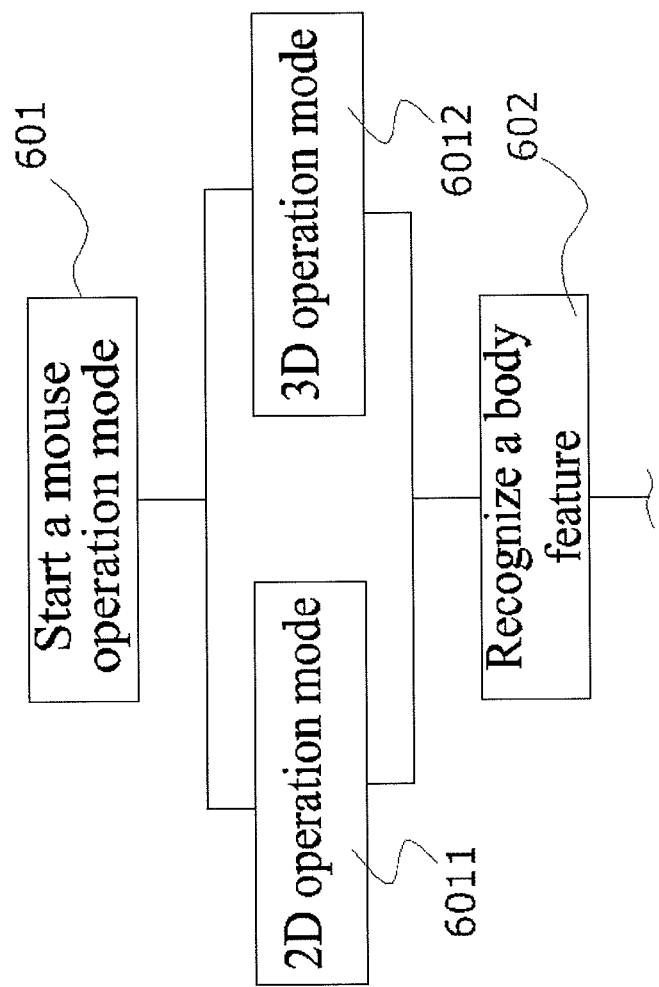
FIG. 7 is a preferred embodiment (1) of the present invention.
Figure 8:
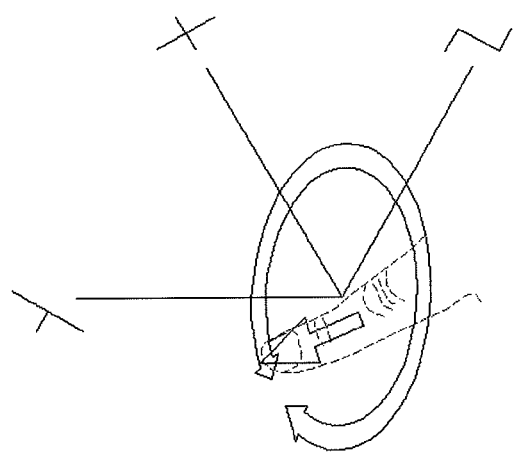
FIG. 8 is a schematic diagram (3) of implementation of the present invention.
Figure 8:
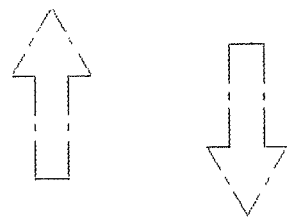
Figure 8:
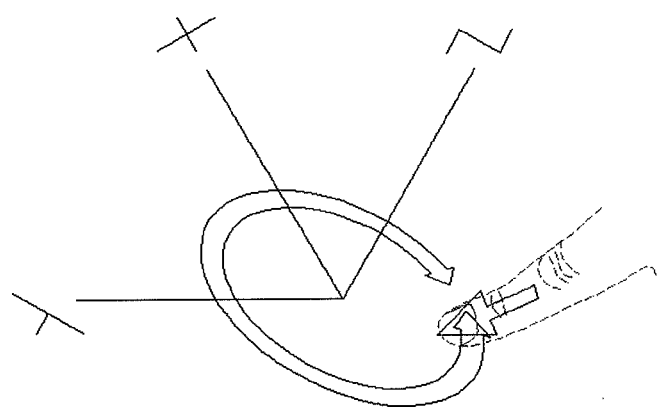

FIG. 7 is a preferred embodiment (1) of the present invention. As shown in FIG. 7, in the whole operation method 60 of the system, the start of the operation mode 601 may further include a 2D operation mode 6011 and a 3D operation mode 6012. The main reason is that in the technique disclosed by the present invention, the multi-view video recording device 11 is used to synchronously capture images at various different view angles of a finger gesture. Therefore, after the execution and computation through the interaction handling program 12, displacement information and depth information of the image may be acquired, which may be further applied in the 3D operation mode 6012. Furthermore, refer to FIG. 8 in combination for the 3D operation mode. FIG. 8 is a schematic diagram (3) of an implementation method according to the present invention. As shown in FIG. 8, the operator may enable the operation cursor to present an operation in a 3D axial direction with a body feature thereof. With the changes of the movement position, the user may execute a command such as a click, dragging, moving the cursor, 3D move and 3D rotation.

Figure 9:
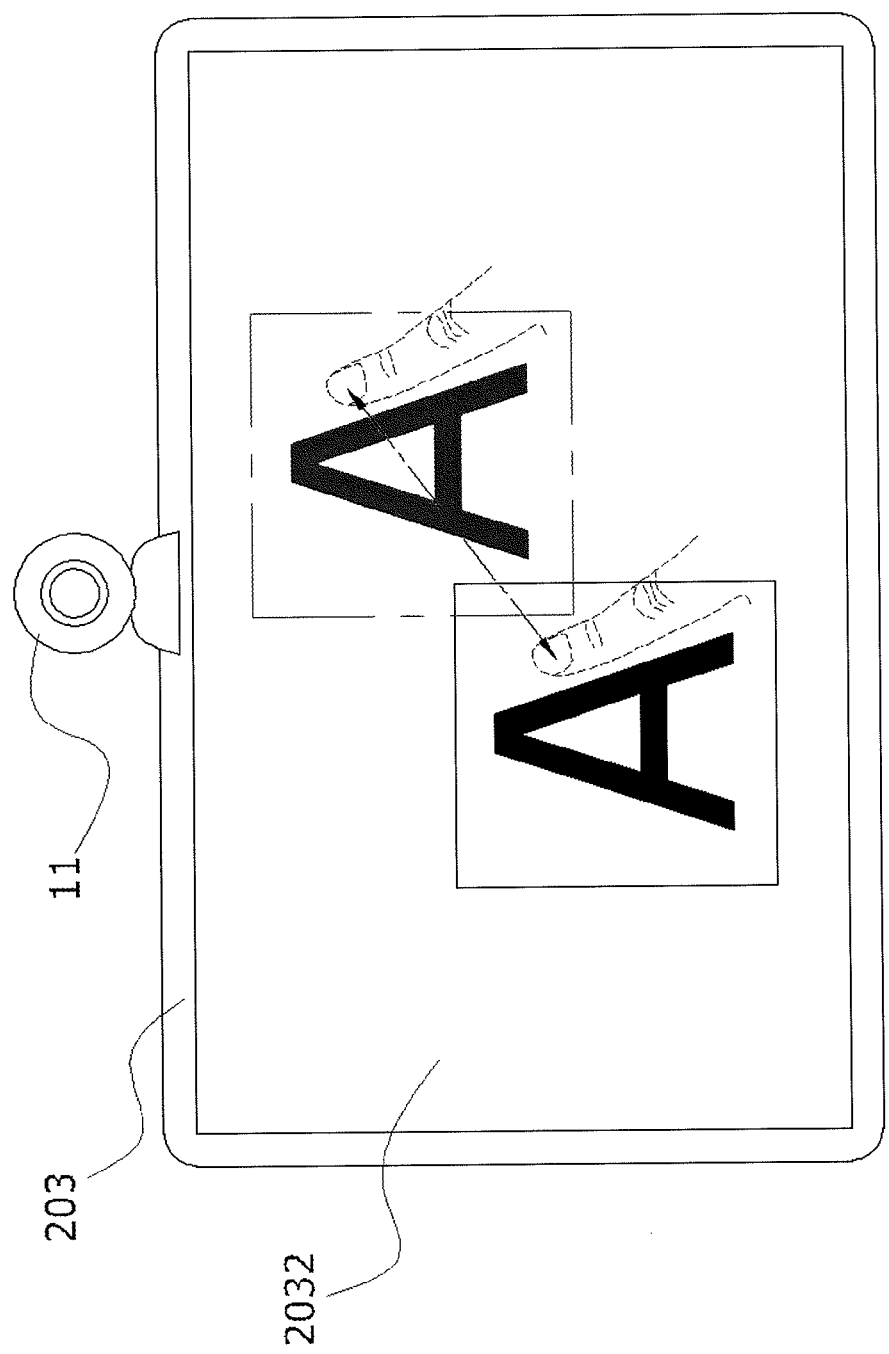
FIG. 9 is a preferred embodiment (2) of the present invention.

FIG. 9 is a preferred embodiment (2) of the present invention. The present invention is also applicable to a "touch-like" operation interface and operation mode. As shown in FIG. 9, the "touch-like" operation interface and operation mode refer to that no operation pointer is generated in a picture of the operation interface 2032 of the display device 203, and the operator, by using the implementation of the present invention, only needs to raise the finger to let the multi-view video recording device 11 capture the image of the motion of the finger, such that the operator may perform a command operation with a noncontact motion in the operation interface 2032. For example, as shown in FIG. 9, the operation may sway in front of the multi-view video recording device 11 with a motion of a finger, select a file or a picture (A), and move the file or the picture or turn pages or perform other execution.

In conclusion, in the present invention, the multi-view video recording device may capture images of the body feature (for example, a finger) of an operator in a multi-view and synchronous manner. The interaction handling program then performs operations such as computation, synthesis, gesture tracking, command recognition, and image presentation to interpret the motion of the body feature of the user. The movement information in the 2D space and the movement information in the 3D space may be both calculated and applied in the operation commands of the corresponding electronic information device, so as to effectively satisfy the 2D and 3D operation demands of the electronic information device. Through the implementation, the present invention may actually achieve the objectives of providing a 3D human-computer interface interaction system capable of capturing a planar motion and depth information of a motion of an operator and precisely interpreting them into motion commands.

The above descriptions are merely preferred embodiments of the present invention, but not intended to limit the scope of the present invention. Equivalent changes and modifications made without departing from the spirit and scope of the present invention shall fall within the patent scope of the present invention.

What is claimed is:

1. A three-dimensional (3D) human-computer interaction system that supports mouse operations through the motion of a finger, capable of being installed in an electronic information device connected with a display device, so that an operator is enabled to perform a noncontact operation at an interaction interface of the electronic information device with a motion of a finger thereof, the system comprising:

a multi-view video recording device, having an information connection with the electronic information device, and comprising an image sensor module and a multi-view image capturing module, wherein the multi-view image capturing module forms a left image capturing path, a central image capturing path, and a right image capturing path, so that the image sensor module synchronously captures multi-view images of the motion of the finger of the operator respectively with the multi-view image capturing module; and an interaction handling program, installed in an operating system of the electronic information device, and used for driving the multi-view video recording device to operate after an initialization operation, the interaction handling program comprising a computation unit for computing the image acquired by the multi-view video recording device and generating image information, a 3D imaging unit for establishing a model of a 3D image for the image information, a gesture tracking unit for tracking the motion of the finger of the operator, and a command recognition unit for recognizing the acquired motion of the finger to map the motion to a preset operation command.

2. The 3D human-computer interaction system that supports mouse operations through the motion of the finger according to claim 1, wherein the left image capturing path of the multi-view image capturing module is formed of a left image capturing opening, a left first reflecting surface, and a left second reflecting surface.

3. The 3D human-computer interaction system that supports mouse operations through the motion of the finger according to claim 1, wherein the right image capturing path of the multi-view image capturing module is formed of a right image capturing opening, a right first reflecting surface, and a right second reflecting surface.

4. The 3D human-computer interaction system that supports mouse operations through the motion of the finger according to claim 1, wherein the interaction handling program has an image presentation unit capable of presenting the 3D image established by the 3D imaging unit at the display device.

5. The 3D human-computer interaction system that supports mouse operations through the motion of the finger according to claim 4, wherein the display device is a 3D display device.

6. The 3D human-computer interaction system that supports mouse operations through the motion of the finger according to claim 1, wherein the image sensor module is a complementary metal-oxide-semiconductor (CMOS) sensor module.

7. The 3D human-computer interaction system that supports mouse operations through the motion of the finger according to claim 1, wherein the image sensor module is a charge-coupled device (CCD) sensor module.

8. An operation method of a three-dimensional (3D) human-computer interaction system that supports mouse operations through the motion of a finger, wherein a multi-view video recording device performs an image capture operation in a synchronous and multi-view manner, and an interaction handling program executes computation and an operation command, the operation method comprising:

starting an operation mode, wherein the interaction handling program starts an operation mode, so that an electronic information device enters the operation mode;

recognizing a body feature, wherein the multi-view video recording device synchronously captures an image of a body feature applied by an operator in multi-view directions, and each captured image is recorded and recognized by the interaction handling program;

acquiring a first position, wherein after the above steps, the interaction handling program acquires a first position of the body feature after the recognition;

tracking the body feature, wherein by using the body feature of the acquired first position as a basic parameter, the multi-view video recording device continuously captures images of the same body feature to achieve an objective of tracking, and when the body feature starts displacement, a next position occurs right away;

computing displacement and a depth, wherein when the body feature moves from the previous position to the next position, the interaction handling program synchronously computes displacement and a depth for the process of position changes of the body feature;

recognizing the body feature and mapping a command, wherein after the computation of the displacement and the depth, the acquired information of the position changes of the body feature is mapped to a pre-defined operation command; and executing the command, wherein the electronic information device operates according to the mapped operation command.

9. The operation method of the 3D human-computer interaction system that supports mouse operations through the motion of the finger according to claim 8, wherein the step of starting the operation mode comprises starting a two-dimensional (2D) operation mode.

10. The operation method of the 3D human-computer interaction system that supports mouse operations through the motion of the finger according to claim 8, wherein the step of starting the operation mode comprises starting a 3D operation mode.

11. The operation method of the 3D human-computer interaction system that supports mouse operations through the motion of the finger according to claim 8, wherein in the step of tracking the body feature, the body feature is any one of a finger, a number of fingers, a finger-like body, a skin color, a shape, a joint position, or a joint motion change.

12. The operation method of the 3D human-computer interaction system that supports mouse operations through the motion of the finger according to claim 8, wherein in the step of tracking the body feature, after the next position occurs, the previous position is recorded and used as a relative reference for the next position.

13. The operation method of the 3D human-computer interaction system that supports mouse operations through the motion of the finger according to claim 8, wherein in the step of computing the displacement and the depth, after the depth computation, a depth map of image depth information is generated.

14. The operation method of the 3D human-computer interaction system that supports mouse operations through the motion of the finger according to claim 8, wherein the pre-defined operation command is any one of moving left, moving right, moving up, moving down, moving forward, and moving backward.

15. The operation method of the 3D human-computer interaction system that supports mouse operations through the motion of the finger according to claim 8, wherein the pre-defined operation command is either a single-click or a double-click.

16. The operation method of the 3D human-computer interaction system that supports mouse operations through the motion of the finger according to claim 8, wherein the pre-defined operation command is dragging.

17. The operation method of the 3D human-computer interaction system that supports mouse operations through the motion of the finger according to claim 8, wherein the pre-defined operation command is a 3D move command.

18. The operation method of the 3D human-computer interaction system that supports mouse operations through the motion of the finger according to claim 8, wherein the pre-defined operation command is a 3D rotation command.

19. The operation method of the 3D human-computer interaction system that supports mouse operations through the motion of the finger according to claim 8, wherein the step of starting the operation mode comprises starting a "touch-like" operation mode.

\* \* \* \* \*